(12) United States Patent
Choe et al.

(10) Patent No.: US 8,768,053 B2
(45) Date of Patent: Jul. 1, 2014

(54) IMAGE PROCESSING APPARATUS AND METHOD OF PROVIDING HIGH SENSITIVE COLOR IMAGES

(75) Inventors: Won-hee Choe, Gyeongju-si (KR);
Jae-hyun Kwon, Yongin-si (KR);
Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 683 days.

(21) Appl. No.: 12/564,109

(22) Filed: Sep. 22, 2009

(65) Prior Publication Data

US 2010/0097495 A1 Apr. 22, 2010

(30) Foreign Application Priority Data

Oct. 17, 2008 (JP) .......................... 10-2008-0102193

(51) Int. Cl.
*G06K 9/00* (2006.01)

(52) U.S. Cl.
USPC ........... 382/167; 382/199; 382/284; 348/235; 348/E9.053

(58) Field of Classification Search
CPC G06T 5/50; G06T 2207/20192; H04N 5/142; H04N 5/213; H04N 5/23232; H04N 9/045; H04N 9/646
USPC ......... 382/240, 166, 239, 243, 299, 250, 167, 382/251, 248, 260, 162, 165, 254, 264, 276, 382/284, 263; 358/539, 445, 474, 512, 518, 358/520, 523; 348/222, 254, 609; 345/589, 345/600, 603, 604
See application file for complete search history.

(56) References Cited

U.S. PATENT DOCUMENTS

| | | | |
|---|---|---|---|
| 4,301,468 A * | 11/1981 | Alvarez ......................... | 348/816 |
| 5,583,601 A | 12/1996 | Peterson | |
| 6,198,514 B1 | 3/2001 | Lee et al. | |
| 6,373,481 B1 * | 4/2002 | Tan et al. ...................... | 715/788 |
| 6,738,169 B1 * | 5/2004 | Nakase ........................ | 358/539 |
| 6,829,385 B2 * | 12/2004 | Nakase ........................ | 382/166 |
| 7,071,978 B2 | 7/2006 | Hunter et al. | |
| 7,082,218 B2 * | 7/2006 | Pollard et al. ................. | 382/167 |

(Continued)

FOREIGN PATENT DOCUMENTS

| | | |
|---|---|---|
| JP | 08-065690 | 3/1996 |
| JP | 10304235 | 11/1998 |

(Continued)

OTHER PUBLICATIONS

Mortimer etal, "Image Brightness", <—http://www.olympusmicro.com/primer/anatomy/imagebrightness.html—>, pp. 1-8, Aug. 19, 2004.*

*Primary Examiner* — Mekonen Bekele
(74) *Attorney, Agent, or Firm* — NSIP Law

(57) ABSTRACT

An image processing apparatus and method for generating high-sensitive, high-brightness color images are disclosed. A second image having a wider band and higher-sensitivity than those of a first image which includes color information may be acquired, wherein the first and second images are images captured from a scene. A first transformed image having high brightness may be generated by performing binning on the first image, and edge information being a high-frequency component may be extracted from the second image. A high-brightness, high-sensitive color image may be generated using the first transformed image and the edge information.

15 Claims, 4 Drawing Sheets

(56) References Cited

U.S. PATENT DOCUMENTS

| | | | |
|---|---|---|---|
| 7,161,619 B1* | 1/2007 | Niida et al. | 348/207.11 |
| 7,367,537 B2* | 5/2008 | Ibe | 248/266 |
| 7,529,042 B2* | 5/2009 | Losee | 359/802 |
| 7,746,386 B2* | 6/2010 | Nakamura et al. | 348/224.1 |
| 7,990,445 B2* | 8/2011 | Rhodes et al. | 348/280 |
| 2003/0234799 A1* | 12/2003 | Lee | 345/660 |
| 2004/0028271 A1 | 2/2004 | Pollard | |
| 2004/0233278 A1 | 11/2004 | Prudhomme et al. | |
| 2005/0088537 A1* | 4/2005 | Nakamura et al. | 348/223.1 |
| 2008/0091065 A1* | 4/2008 | Oshima et al. | 600/109 |
| 2008/0177144 A1* | 7/2008 | Otawara | 600/157 |
| 2008/0231639 A1* | 9/2008 | Matsushima | 345/589 |
| 2009/0027425 A1* | 1/2009 | Park et al. | 345/690 |
| 2010/0165134 A1* | 7/2010 | Dowski et al. | 348/218.1 |

FOREIGN PATENT DOCUMENTS

| | | |
|---|---|---|
| JP | 2001-153621 | 6/2001 |
| JP | 2002-359728 | 12/2002 |
| KR | 100257743 | 3/2000 |
| KR | 1020020039633 | 5/2002 |
| KR | 1020050015737 | 2/2005 |

* cited by examiner

FIG.3A

| R | G |
|---|---|
| B | W |

R: RED ENHANCER FILTER
G: GREEN ENHANCER FILTER
B: BLUE ENHANCER FILTER
W: WHITE ENHANCER FILTER

FIG.3B

| R | G |
|---|---|
| B | M |

R: RED ENHANCER FILTER
G: GREEN ENHANCER FILTER
B: BLUE ENHANCER FILTER
M: MAGENTA FILTER

IMAGE PROCESSING APPARATUS AND METHOD OF PROVIDING HIGH SENSITIVE COLOR IMAGES

CROSS-REFERENCE TO RELATED APPLICATION(S)

This application claims the benefit under 35 U.S.C. §119(a) of Korean Patent Application No. 10-2008-0102193, filed on Oct. 17, 2008, the disclosure of which is incorporated herein in its entirety by reference.

BACKGROUND

1. Field

The following description relates to image processing, and more particularly, to an image processing apparatus and method of generating high-sensitive color images.

2. Description of the Related Art

In general, a camera includes a lens, an image sensor, etc., such that the lens collects light reflected from objects and the image sensor converts light collected by the lens into electrical image signals. Image sensors can be classified into image pickup tubes and solid image sensors. Representative solid image sensors may include charge coupled devices (CCDs), complementary metal oxide semiconductors (CMOSs), etc.

A conventional technology for improving the resolution of images acquired by such a camera is to reduce a unit area occupied by each pixel without changing the whole sensing area. That is, by reducing a unit pixel area to increase the number of pixels in a sensing area, high-resolution images can be acquired. However, while this method may be effective in acquiring high-resolution images, it may be ineffective in acquiring high-sensitive images due to a reduction of the quantity of light reaching each pixel.

SUMMARY

One general aspect includes an image processing apparatus, including a color image processor to generate a first transformed image with lower-resolution and higher-brightness than those of a first image including color information for a wavelength band of visible light, from the first image, an edge information extractor to extract edge information from a second image including image information of a band wider than that of the first image, wherein the second image is an image captured from the same scene as the first image, and an image restoring unit to generate a restored image using the first transformed image and the edge information of the second image.

The color image processor may perform binning on the first image which combines at least two pieces of pixel information detected by at least two pixel-based sensors to generate one piece of pixel information, so as to generate the first transformed image.

The edge information extractor may separate a high-frequency image signal of the is second image from a low-frequency image signal of the second image, and may extract the high-frequency image signal as edge information.

The separating of the high-frequency image signal of the second image from the low-frequency image signal of the second image may be performed by Discrete Cosine Transform (DCT) or Wavelet-Transform (WT).

In response to a wavelet-transformed image divided into the first-frequency image signal and the low-frequency image signal being generated from the second image by the edge information extractor, the image restoring unit may replace the low-frequency image signal part of the second image by the first transformed image and may inverse-transform the resultant image, so as to generate the restored image.

The image restoring unit may generate the restored image by interpolating the first transformed image based on the edge information of the second image.

The first image may be sensed from visible-light wavelengths of optical signals among incident optical signals, and the second image is sensed from white signals, white signals with infrared rays, infrared signals, or complementary wavelengths of the incident optical signals.

According to another general aspect, there may be provided an image processing method, including generating a first transformed image having lower resolution and higher brightness than those of a first image having a color wavelength band of visible light, from the first image, extracting edge information from a second image including image information of a band wider than that of the first image, wherein the second image is an image captured from the same scene as the first image, and generating a restored image using the first transformed image and the edge information of the second image.

Other features and aspects will be apparent from the following details description, the drawings, and the claims.

BRIEF DESCRIPTION OF THE DRAWINGS

FIGS. 3A and 3B illustrate exemplary constructions of filtering units included in the image acquiring unit illustrated in FIG. 2.

Figure 1:
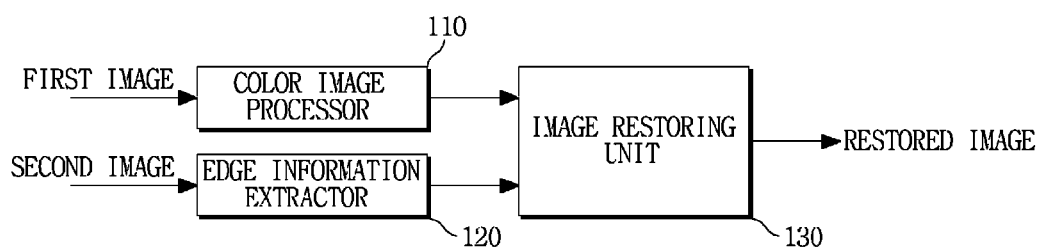
FIG. 1 is a block diagram illustrating an exemplary image processing apparatus to generate high-brightness, high-sensitive color images.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a block diagram illustrating an exemplary image processing apparatus to generate high-brightness, high-sensitive color images.

Referring to FIG. 1, the image processing apparatus includes a color image processor 110, an edge information extractor 120, and an image restoring unit 130. The color image processor 110 generates a first transformed image having low-resolution and high-brightness, from a first image including color information corresponding to a color band of visible light. The edge information extractor 120 receives a second image having higher sensitivity and wider bandwidth than those of the first image and extracts edge information from the second image, wherein the first and second images are images captured from an identical scene. The image restoring unit 130 restores a high-resolution, high-brightness image using the first transformed image and the edge information of the second image.

According to an embodiment, the first image may be sensed from visible-light wavelengths of optical signals among incident optical signals. The second image may be sensed from white signals, white signals with infrared rays, infrared signals, or complementary wavelengths of incident optical signals. The second image may be acquired from various wavelengths of optical signals to have more accurate contrast information and more abundant texture information than those of the first image.

The respective components of the image processing apparatus will be described in detail with reference to FIG. 1, below.

The color image processor 110 receives a first image including color information of a visible-light band, and generates a first transformed image having lower resolution and higher brightness than those of the first image. If a color image is an image signal obtained by sensing an optical signal that has passed through a Bayer-pattern RGB filter, a 3-channel (R, G and B) color image is generated by interpolating pixel array values corresponding to the optical signal, and the RGB color image can be input as the first image to the color image processor 110.

The color image processor 110 performs binning on the first image which combines at least two pieces of pixel information detected by at least two pixel-based sensors to generate one piece of pixel information, thus generating the first transformed image. Binning is a procedure in which several pixels are grouped into a function unit, which has the effect of reducing the impact of read noise on the signal to noise ratio (SNR). For example, a 2×2 binning procedure sums values sensed from four pixel sensors, and records the sum as a pixel value in an image. If such binning is performed on a color image, the resolution of the color image is reduced to ¼ and the brightness thereof is increased to 4 times.

The color image processor 110 is included in an output circuit of an image acquiring unit which will be described later with reference to FIG. 2, and can convert a color image signal subjected to binning into a digital signal and then output the result of the conversion as the first transformed image. Or, the color image processor 110 can convert a color image signal into a digital signal and then perform binning on the digital signal, thus generating the first transformed image.

The color image may be a signal in a RGB color space in which color signals are uniformly distributed, or may be a signal in a color space, such as YCbCr, HSL (Hue, Saturation, Intensity), Lab, YUV, etc. However, the color image is not limited to the above examples, and can have various formats.

The edge information extractor 120 receives a second image corresponding to an identical scene as that of the first image, the second image including image information of a band wider than that of the first image, and extracts edge information from the second image. If the second image is a color image signal in a color space in which color information is separated from brightness information, only edge information corresponding to brightness signals can be extracted.

The edge information extractor 120 can extract edge information from a high-brightness image signal using one of various known methods. For example, edge information is extracted using an edge operator, such as a homogeneity operator, difference operator, compass gradient operator, etc. As another example, edge information is extracted as high-frequency components of the second image which are separated from low-frequency components of the second image through Discrete Cosine Transform (DCT) or Wavelet Transform.

The image restoring unit 130 generates a restored image using the first transformed image and the edge information of the second image. The image restoring unit 130 can generate a restored image by a resolution restoring technology using the first transformed image and the edge information of the second image. Various image restoring technologies can be utilized to minimize errors caused by interpolation based on edge information when generating a high-resolution image by interpolating (or upsampling) a low-resolution image. For example, the image restoring unit 130 performs color interpolation on the first transformed image in consideration of the directions of the edges of the second image.

Or, in response to the edge information extractor 120 generating a wavelet-transformed image including high-frequency image signals and low-frequency image signals which are separated from the second image, the image restoring unit 130 replaces the low-frequency image signal portion of the wavelet-transformed image by the first transformed image, and inverse-transforms the resultant image, thus generating a restored image. Accordingly, the image restoring unit 130 can replace the low-frequency image signal portion of the wavelet-transformed image by the first transformed image for each channel of the first transformed image. The resultant image is inverse-transformed, thus generating a restored image. The channel may include color information in an existing color space where image signals are represented. For example, the channel may include Y, Cb or Cr signals in a YCbCr color space or R, G or B signals in a RGB color space.

Figure 2:
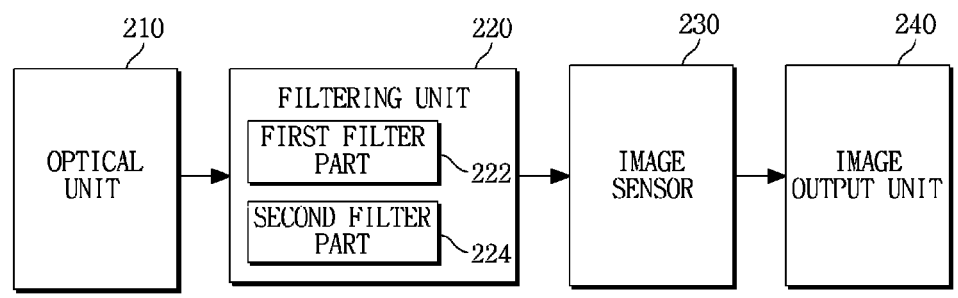
FIG. 2 is a block diagram illustrating an exemplary image acquiring unit which can be included in the image processing apparatus illustrated in FIG. 1.

FIG. 2 is a block diagram illustrating an exemplary image acquiring unit which can be included in the image processing apparatus illustrated in FIG. 1. Referring to FIG. 2, the image acquiring unit includes an optical unit 210, a filtering unit 220, an image sensor 230, and an image output unit 240. The image acquiring unit outputs the first image to the color image processor 110, and outputs the second image to the edge information extractor 120 (see FIG. 1).

The optical unit 210 condenses light reflected from objects. The optical unit 210 may include at least one lens, and a number of lenses included in the optical unit 210 is dependent on a purpose of the optical unit 210. Also, the lens can be disposed in various configurations on the same plane.

The filtering unit 220 filters an optical signal incident through the optical unit 210 to filter wavelengths belonging to a predetermined wavelength band. In the filtering unit 220, a plurality of filters can be formed to correspond to various pixels.

According to an embodiment, the filtering unit 220 includes a first filter part 222 to pass a color wavelength band therethrough to allow the image sensor 230 to sense the first image from among incident optical signals, and a second filter part 224 to pass predetermined wavelength bands therethrough to allow the image sensor 230 to sense images (e.g., the second image) belonging to a band wider than that of the first image.

The first filter part 222 may be configured to pass therethrough a color wavelength band of optical signals condensed by the optical unit 210. For example, the first filter part 222 may be configured to pass therethrough optical signals belonging to wavelength bands of Red, Green and Blue. The second filter part 224 may be configured to pass therethrough one of white signals, white signals with infrared rays, infrared signals, and complementary wavelengths of incident optical signals.

A complementary color filter to perform passing of complementary wavelengths of optical signals therethrough may be one of a Cyan filter (which is complementary to red), a Magenta filter (which is complementary to green), and a Yellow filter (which is complementary to blue). The Cyan filter passes only green and blue wavelength bands therethrough among light condensed by the optical unit 210, the Magenta filter passes only red and blue wavelength bands therethrough among the condensed light, and the Yellow filter passes only red and green wavelength bands therethrough among the condensed light.

Also, the second filter part 224 may be a white filter to pass white signals with infrared rays therethrough. Or, the second filter part 224 may be a white filter with an infrared (IR) cut-off filter to pass white signals without infrared rays therethrough.

The image sensor 230 converts the optical signals that have passed through the filtering unit 220 into electrical signals. The image sensor 230 may convert the optical signals into electronic signals using a sensing layer. The image sensor 230 includes a visible-light sensing layer to convert a visible-light band of optical signals into electrical signals, and an infrared sensing layer to convert an infrared band of optical signals into electrical signals, thus sensing visible-light signals and infrared signals.

The image sensor 230 can obtain signals of red light ($I_R$), green light ($I_G$) and blue light ($I_B$) from optical signals that have passed through the first filter part 222 of the filtering unit 220. If the second filter part 224 of the filtering unit 220 is a complementary filter, the image sensor 230 can sense complementary bands of signals, and if the second filter part 224 is a white filter, the image sensor 230 can sense a white-light signal $I_W$ from signals that have passed through the full-band of visible light.

If the second filter part 224 is a complementary filter to perform passing of complementary wavelengths of optical signals therethrough, two color components can be extracted from one pixel, to allow images having two-times higher resolution and sensitivity than in an RGB layer pattern filter to be obtained. Also, if the second filter part 224 includes a complementary filter and an all-pass filter, color conversion can be simplified as it utilizes only a complementary filter and a white filter, as compared to the case of converting primary color signals into color difference signals Cb, Cr and Y using all signals of red, green and blue light. The color difference signal Y can be considered as a white signal $I_W$, Cr can be obtained by subtracting the white signal $I_W$ from the red-light signal $I_R$, and Cb can be obtained by subtracting the white signal $I_W$ from the blue-light signal $I_B$.

The image output unit 240 is included in the image acquiring unit, to perform image processing before transferring the first and second images to the color image processor 110 and edge information extractor 120, respectively. For example, if the filtering unit 220 is configured to simultaneously acquire the first and second images, the image processor 240 interpolates the acquired images, thus obtaining the first and second images of equal size. Also, if the second filter part 224 includes an all-pass filter (hereinafter, referred to as a first filter) and a IR cut-off filter (hereinafter, referred to as a second filter), the image sensor 230 can acquire only infrared signals by subtracting signals that have passed through the second filter from signals that have passed through the first filter.

In FIG. 2, a single image acquiring unit acquires all signals corresponding to the first and second images. However, two or more image acquiring units can be provided to acquire signals of the first image and signals of the second image separately.

FIGS. 3A and 3B are views illustrating a filtering unit 220 included in the image acquiring unit illustrated in FIG. 2.

As illustrated in FIGS. 2 and 3A, the filtering unit 220 can include the first filter part 222 to pass therethrough red (R), green (G) and blue (B) color signals, and the second filter part 224 to pass therethrough white (W) signals having a band wider than those of the RGB color signals.

The filtering unit 220, as illustrated in FIGS. 2 and 3B, can also include the first filter part 222 to pass therethrough red (R), green (G) and blue (B) color signals, and the second filter part 224 which is a complementary filter (e.g., a Magenta filter) to pass therethrough signals having a band wider than that of each RGB color signal. Also, the filtering unit 220 can be configured in various ways in order to obtain a first image including color information and a second image including detail information. Also, the filtering unit 220 can extend in a horizontal or vertical direction based on a basic structure including four pixels.

Figure 4:
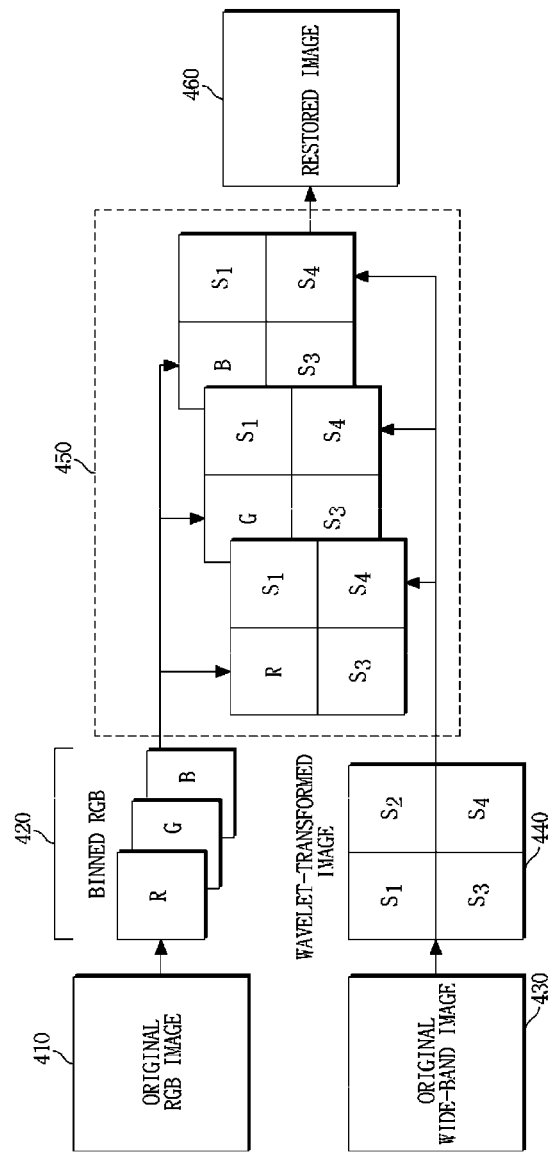
FIG. 4 is a view illustrating a method of generating high-brightness, high-resolution images using RGB images and Infrared-ray (IR) images.

FIG. 4 is a view illustrating an exemplary method of generating high-brightness, high-resolution images using RGB images and Infrared ray (IR) images.

Referring to FIG. 4, an original RGB image 410 and an original wideband image 420 captured from the same scene may be input as a first image and a second image, respectively.

The original RGB image 410 is generated as a binned RGB color image 420 with low resolution and high brightness.

The original wideband image 430 is subjected to wavelet transformation, so that an image including low-frequency components and high-frequency edge information which are separated from the original wideband image 430 is generated. In response to a general wavelet transformation being performed on the original wideband image 430, one piece S1 of low-frequency information and three pieces S2, S3 and S4 of high-frequency information corresponding to the original wideband image 430 are obtained. The low-frequency information S1 is a main part of the original image, and the three pieces S2, S3 and S4 of high-frequency information are edge information corresponding to horizontal-direction, vertical-direction and diagonal-directional components of the original image, respectively.

According to an embodiment, the low-frequency information S1 is replaced by the binned RGB color images 420 to generate image data 450, and inverse wavelet transformation is performed on the image data 450, to allow a restored image 460 to be generated. Referring to FIG. 4, where the low-frequency information S1 of a wavelet-transformed image 440 is replaced by each of the binned R, G and B color images, three-channel image data 450 is generated. If inverse wavelet transformation is performed on image data of each channel of the three-channel image data 450, a three-channel high-resolution, high-brightness color image 460 may be restored. In the exemplary embodiment, the low-frequency information of the wavelet-transformed image 440 is replaced by each of the three-channel RGB images, but it may be replaced selectively by any of the three-channel RGB images.

As such, according to an exemplary embodiment, low-resolution, high-brightness color information is added to high-resolution, high-brightness edge information, so that a color image with high-resolution, high-brightness color information may be restored.

Figure 5:
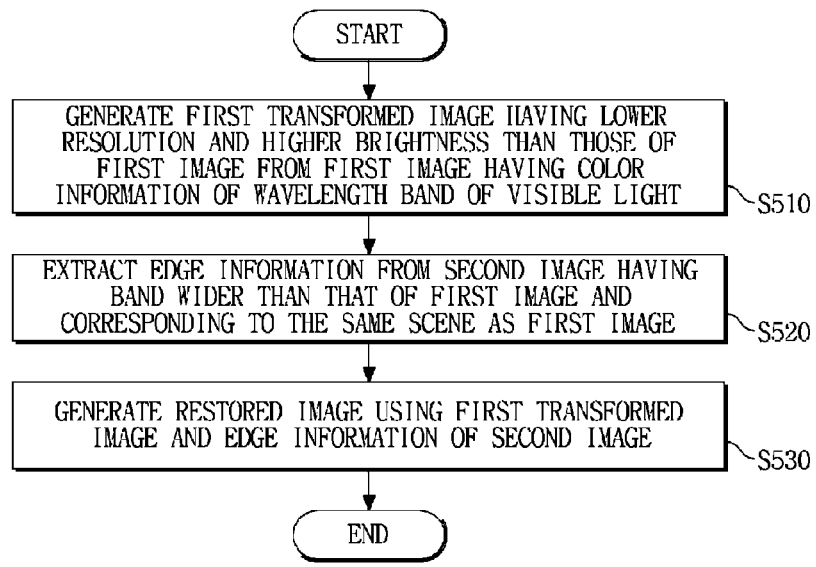
FIG. 5 is a flowchart illustrating an exemplary image processing method of generating high-sensitive images.

FIG. 5 is a flowchart illustrating an exemplary image processing method of generating high-sensitive images.

In operation S510, a first image including color information corresponding to a wavelength band of visible light is received, and a first transformed image having lower resolution and higher brightness than those of the first image is generated from the first image. The first transformed image may be generated by performing binning on the first image that combines at least two pieces of pixel information detected by at least two pixel-based sensors to generate one piece of pixel information.

In operation S520, a second image having a wider-band and higher-brightness than those of the first image is received, and edge information is extracted from the second image, wherein the first and second images are images captured from the same scene (i.e., two scenes which are identical to each other). The first image may be sensed from a color band of optical signals, and the second image may be sensed from white signals, white signals with infrared rays, infrared signals, or complementary wavelengths of incident optical signals. In operation S520, wavelet transformation is performed on the second image to separate high-frequency image signals from low-frequency image signals, and the high-frequency image signals are extracted as the edge information.

The operations S510 and S520 may be performed sequentially, in a reverse order, or simultaneously.

In operation S530, a restored image is generated using the first transformed image and the edge information of the second image. In operation S530, the restored image may be generated by interpolating the first transformed image based on the edge information of the second image. Also, in operation S520, the restored image may be generated by replacing the low-frequency part of a wavelet-transformed image of the second image by the first transformed image and performing inverse wavelet transformation on the resultant image.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus, comprising:
   a color image processor configured to generate a first transformed image with lower-resolution and higher-brightness than those of a first image including color information corresponding to a wavelength band of visible light, from the first image;
   an edge information extractor configured to extract edge information from a second image including image information of a band wider than that of the first image, wherein the second image is an image captured from the same scene as the first image; and
   an image restoring unit configured to generate a restored image using the first transformed image and the edge information of the second image, wherein the first transformed image has a brightness automatically set to be higher by a factor than the first image and a resolution automatically set to be lower by the same factor than the first image.

2. The image processing apparatus of claim 1, wherein the color image processor performs binning on the first image which combines at least two pieces of pixel information detected by at least two pixel-based sensors to generate one piece of pixel information, so as to generate the first transformed image.

3. The image processing apparatus of claim 1, wherein the edge information extractor separates a high-frequency image signal of the second image from a low-frequency image signal of the second image, and extracts the high-frequency image signal as edge information.

4. The image processing apparatus of claim 3, wherein the separating of the high-frequency image signal of the second image from the low-frequency image signal of the second image is performed by Discrete Cosine Transform (DCT) or Wavelet-Transform (WT).

5. The image processing apparatus of claim 4, wherein in response to a wavelet-transformed image divided into the first-frequency image signal and the low-frequency image signal being generated from the second image by the edge information extractor, the image restoring unit replaces the low-frequency image signal part of the second image by the first transformed image and inverse-transforms the resultant image, so as to generate the restored image.

6. The image processing apparatus of claim 1, wherein the image restoring unit generates the restored image by interpolating the first transformed image based on the edge information of the second image.

7. The image processing apparatus of claim 1, wherein the first image is sensed from visible-light wavelengths of optical signals among incident optical signals, and the second image is sensed from white signals, white signals with infrared rays, infrared signals, or complementary wavelengths of the incident optical signals.

8. An image processing method, comprising:
   generating a first transformed image having lower resolution and higher brightness than those of a first image having a color wavelength band of visible light, from the first image;
   extracting edge information from a second image including image information of a band wider than that of the first image, wherein the second image is an image captured from the same scene as the first image; and
   generating a restored image using the first transformed image and the edge information of the second image, wherein the first transformed image has a brightness automatically set to be higher by a factor than the first image and a resolution automatically set to be lower by the same factor than the first image.

9. The image processing method of claim 8, wherein the generating of the first transformed image comprises performing binning on the first image which combines at least two pieces of pixel information detected by at least two pixel-based sensors to generate one piece of pixel information.

10. The image processing method of claim 8, wherein the extracting of the edge information comprises separating a high-frequency image signal of the second image from a low-frequency image signal of the second image, and extracting the high-frequency image signal of the second image as the edge information.

11. The image processing method of claim 10, wherein the separating of the high-frequency image signal of the second image from the low-frequency image signal of the second image is performed by Discrete Cosine Transform (DCT) or Wavelet Transform (WT).

12. The image processing method of claim 11, wherein the extracting of the edge information comprises generating a wavelet-transformed image divided into the high-frequency image signal and the low-frequency image signal from the second image, and
the generating of the restored image comprises replacing the low-frequency image signal part of the wavelet-transformed image by the first transformed image and inverse-transforming the resultant image, thereby generating the restored image.

13. The image processing method of claim 8, wherein the generating of the restored image comprises interpolating the first transformed image based on the edge information of the second image.

14. The image processing method of claim 8, wherein the first image is sensed from visible-light wavelengths of optical signals among incident optical signals, and the second image is sensed from white signals, white signals with infrared rays, infrared signals, or complementary wavelengths of incident optical signals.

15. A non-transitory computer-readable storage medium storing a program to perform image processing, comprising instructions to cause a computer to:
generate a first transformed image having lower resolution and higher brightness than those of a first image having a color wavelength band of visible light, from the first image;
extract edge information from a second image including image information of a band wider than that of the first image, wherein the second image is an image captured from the same scene as the first image; and
generate a restored image using the first transformed image and the edge information of the second image, wherein the first transformed image has a brightness automatically set to be higher by a factor than the first image and a resolution automatically set to be lower by the same factor than the first image.

* * * * *